US011442822B1

(12) United States Patent
Chopra et al.

(10) Patent No.: US 11,442,822 B1
(45) Date of Patent: Sep. 13, 2022

(54) PROVIDING AN EFFICIENT PREVIEW CAPABILITY FOR RESTORING EMAILS BACKED UP TO AN OBJECT STORAGE

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN); Ravi Vijayakumar Chitloor, Bengaluru (IN); Himanshu Arora, Bangalore (IN); Tushar Dethe, Bangalore (IN); Deependra Singh, Kanpur (IN); Prabhat Kumar Dubey, Chikkanagamangala (IN); Anjana Rao, Mangalore (IN); Sapna Chauhan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 17/229,170

(22) Filed: Apr. 13, 2021

(51) Int. Cl.
*G06F 11/10* (2006.01)
*G06F 11/14* (2006.01)
*G06F 16/16* (2019.01)

(52) U.S. Cl.
CPC ...... *G06F 11/1469* (2013.01); *G06F 11/1435* (2013.01); *G06F 11/1451* (2013.01); *G06F 11/1464* (2013.01); *G06F 16/168* (2019.01)

(58) Field of Classification Search
None
See application file for complete search history.

(56) References Cited

U.S. PATENT DOCUMENTS

| 10,938,765 | B1* | 3/2021 | Schroeder | H04L 51/42 |
| 2015/0007342 | A1* | 1/2015 | Thorpe | G06F 21/62 726/26 |
| 2017/0279929 | A1* | 9/2017 | Kruger | H04L 63/083 |
| 2019/0087280 | A1* | 3/2019 | Kumar | G06F 11/1469 |
| 2022/0043836 | A1* | 2/2022 | Upadhyay | G06F 16/285 |

* cited by examiner

*Primary Examiner* — Jau Shya Meng
(74) *Attorney, Agent, or Firm* — Dergosits & Noah LLP; Todd A. Noah (57) ABSTRACT

In some embodiments, described is a system (and method) for providing an efficient preview capability for emails backed up to a cloud-based object storage. The email preview may be provided as part of an interface allowing a user to select individual emails to restore from the object storage. The system may extract specialized preview information as part of a backup procedure. The preview information may include metadata and email content. For example, the preview information may include various email details such as sender, receiver, subject line, time sent/received, filenames of any attachments, etc. The preview information may also include email content such as particular sentences from the email body containing keywords. The system may also store extracted preview information in a specialized manner such that the preview information may be retrieved without having to access the actual backup data.

20 Claims, 5 Drawing Sheets

PROVIDING AN EFFICIENT PREVIEW CAPABILITY FOR RESTORING EMAILS BACKED UP TO AN OBJECT STORAGE

TECHNICAL FIELD

This disclosure relates to cloud-based storage systems, and more particularly, providing the ability to preview backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits associated with such on-demand systems such as cost efficiency and scalability. These cloud-based systems may implement an object-based storage architecture, and accordingly, client data such as backup data may be stored as objects (or data objects). To limit the amount of data transferred during a backup procedure, the client data may be stored to a cloud-based object storage using incremental backups. For example, only the changes to the client data since the previous backup will be as part of the incremental backup.

Clients employing data and recovery services often require backup applications to provide various tools customized to the type of data being backed up. For example, when email data is backed up, these tools may provide the ability to perform specialized restore (or recovery) operations for backed-up emails. However, when email data is stored as objects, and when incremental backups are implemented, customizable restore operations may not be available. For example, the native capabilities of third-party object storages may not directly support granular restore operations associated with incremental backup data. As a result, as the amount of backed-up email data increases, performing a granularized restore operation becomes increasingly complex. This results in increased costs incurred by clients of a cloud-based object storage. Thus, there is a continued need to provide specialized recovery tools for email backups stored on a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for providing an efficient preview capability for emails backed up to a cloud-based object storage. For example, an email preview may be provided as part of an interface allowing a user to select individual emails to restore from the object storage. To provide such a capability, the system may extract specialized preview information (e.g. identifying information) from the email data to be backed up. In some embodiments, the extraction may be performed as part of a backup procedure that backs up emails to a cloud-based object storage. The preview information may include metadata associated with the emails as well as particular email content. For example, the preview information may include various email details (or metadata) such as sender, receiver, subject line, time sent/received, filenames of any attachments, etc. The preview information may also include email content such as particular sentences from the email body. The system may also allow the preview information to be customized. For example, the system may extract sentences for the preview that contain user-defined keywords. In addition, the system may allow for a user to customize a preview limit that specifies the amount of data to be stored for an email preview. Accordingly, the amount and type of preview information extracted may be tailored based on the defined preview limit. For example, the system may extract additional sentences of the email body until the preview limit is satisfied. Accordingly, the system may provide a preview that includes information that may be more relevant than merely relying on message preview data that may be provided by an email application. For instance, the message preview data provided by an email application may be limited such as providing only the first few sentences of the email body. Moreover, the message preview data provided by an email application may be supported in an inconsistent or unreliable manner. Accordingly, the system described herein, may instead extract specialized preview information that is customizable for identifying relevant emails when performing an email recovery.

The system may also store extracted preview information in a specialized manner for efficient retrieval. For example, the system may store the extracted preview information in a specialized metadata database. This metadata database may be configured to provide readily available (e.g. high performance) access and may be distinct from the objects that store the actual backup data, which may be compressed, encrypted, deduplicated, etc. Accordingly, the system may access the metadata database to obtain the preview information without having to access the actual backup data. As a result, the system can forego accessing the actual backup data until after the preview information is provided and particular emails to be restored are identified. Thus, in some embodiments, the system provides the ability to efficiently provide an email preview for initiating a granular restore of individual emails.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
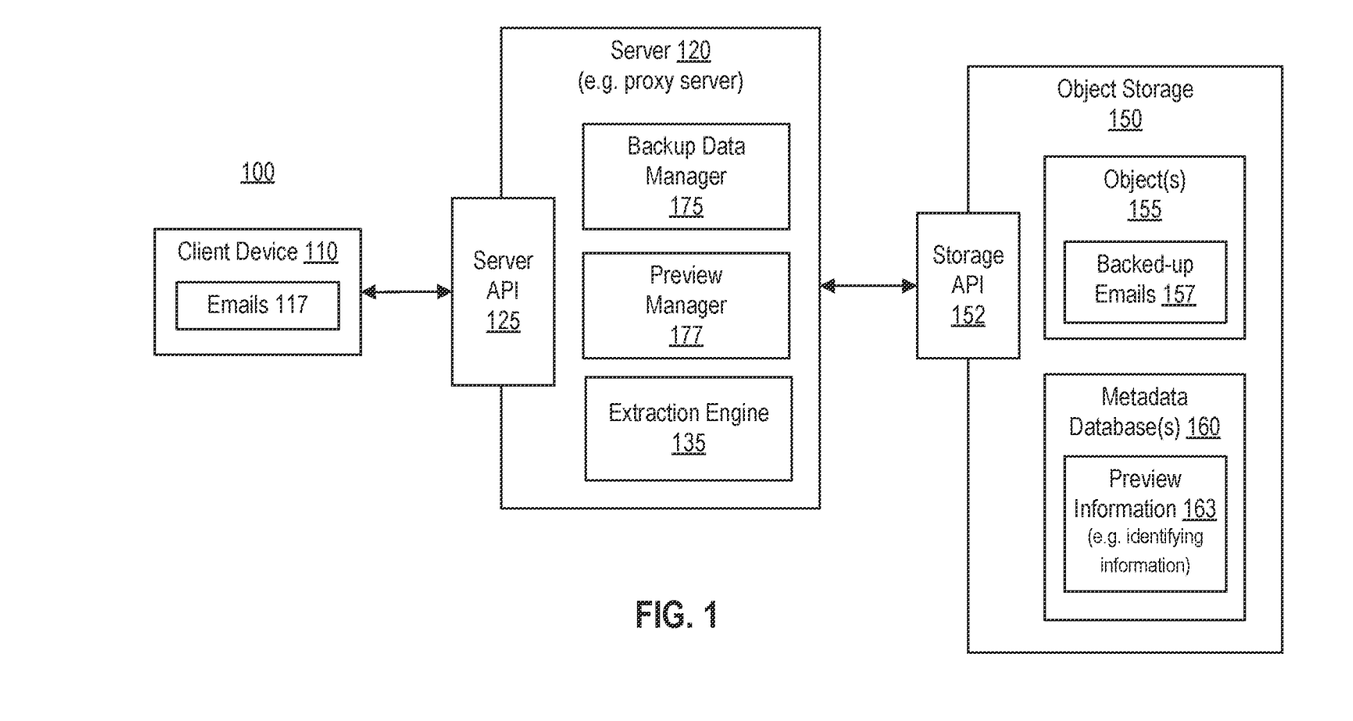
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the server 120 may include a backup system. In some embodiments, the client device 110 (or client data stored by the client device 110) may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. Accordingly, the client device 110 may be a source of, or associated with, client data to be backed up to the object storage 150. In some embodiments, the client data may include emails (or email data) 117. In some embodiments, the client device 110 may include, or work in conjunction with, a cloud-based component (e.g. server) that manages client data. For example, the client device 110 may include, or be associated with, a server (e.g. email server) that manages emails 117 as part of a cloud-based service (e.g. cloud-based email service). For example, in some embodiments, the server 120 may obtain emails 117 (or copies thereof) associated with a client device 110 directly from such an email server.

The object storage (or object storage system) 150 may include a persistent object storage that implements a storage architecture that manages data as an object(s) 155. For example, each object 155 stored by the object storage 150 may include data, meta-data, and/or a globally unique identifier for the object. These objects 155 may store the backed-up emails (or backup data) 157. In some embodiments, an object may include a unit of storage used by a cloud-based object storage and may include a collection of objects that may be referred to as containers, buckets, and the like (e.g. depending on the cloud-based storage provider). In some embodiments, the object storage 150 may include various storage tiers (not shown). Accordingly, objects 155 (e.g. backed-up emails 157) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs.

As described, the server 120 may act as an intermediary for managing client backup data stored on the object storage 150. In some embodiments, the server 120 (or backup system) may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. It should be noted that the same set of operations provided by the server API 125 may be used by the client device 110 irrespective of the type of object storage 150 (e.g. object storage provider). To provide such object-storage-agnostic functionality, the server 120 may include a function library that includes object-storage-specific (or provider-specific) functions. In other words, the function library may include a specific set of functions that are configured to interact with a particular object storage (e.g. object storage provider). Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations.

As described, the server 120 may manage backed-up client data stored on the object storage 150. Accordingly, the server 120 may include a backup data manager 175. The backup data manager (or data manager) 175 may coordinate (or manage, orchestrate, execute, automate, etc.) the initiation (or execution) of storage and recovery operations on the object storage 150. The server 120 may also include a preview manager 177. The preview manager 177 may be part of, or work in conjunction with, the backup data manager 175 to manage preview information 163 of backed-up emails as further described herein. In some embodiments, the preview manager 177 may provide a user interface that allows a user to perform and configure various settings associated with providing an email preview. For example, the user interface may allow a user to configure (e.g. input) various settings such as the type of information (e.g. identifying information) to provide as part of the preview, a preview limit (e.g. the amount of information to include as part of the preview), and various other settings associated with providing an email preview. The preview manager 177 may also provide a user interface that displays the preview information 163 (e.g. identifying information) as part of an email preview and allows a user to select particular emails to restore as further described herein. In addition, the preview manager 175 may direct (or control, initiate, etc.) other components of the operating environment 100 to perform various processes as further described herein.

The server 120 may also include an extraction engine 135. The extraction engine 135 may extract identifying information (or email identifying information) from emails 117 (or email data) as further described herein. For example, the extraction engine 135 may process emails 117 to obtain the identifying information based on settings (or rules, preferences, etc.) that may be customized by a user (or account, client, etc.). The extracted identifying information may be stored as part of the preview information 163 that may be stored within the metadata database 160.

To further improve potential storage and recovery efficiency, the server 120 may leverage a specialized metadata database 160. The metadata database 160 may include one or more data stores that may reside on different physical components. The metadata database 160 may be maintained by the server 120. The metadata database 160 may be an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. In some embodiments, portions of the metadata database 160 may be cached (or stored locally) by the server 120 for efficient access. For example, when providing an email preview for a particular email account, preview information 163 associated with the particular email account may be copied to a local storage of the server 120. In some embodiments, when the metadata database 160 resides on the object storage 150, the server 120 may access (e.g. update) the metadata database 160 by accessing the storage API 152.

The metadata database 160 may also store additional metadata associated with client data stored on the client device 110 and/or backed up to the object storage 150. The metadata database 160 may also store various types of backup information associated with the backed-up emails 157. For example, the metadata database 160 may include a data catalog (or table, database, index, etc.). The data catalog may store information associated with the data stored as part of each backup. In some embodiments, the data catalog may be maintained for a particular account (or sub-account) associated with a client. For example, a data catalog may be maintained for each email account (or user, mailbox, address, etc.). The data catalog may also store various types of backup information associated with the backed-up emails 157. For example, the backup information may include a point-in-time the backed-up emails 157 were backed up, a storage location of the backed-up emails 157, an object ID to which the backed-up emails 157 are stored, and various other types of information. The metadata database 160 may also include a backup catalog (or index, table, database, etc.) that stores information associated with each backup performed to the object storage 150. For example, the backup catalog may include backup times specifying when each backup was performed, a backup expiration time, a type of backup (e.g. full or incremental), and any other information that may be associated with performing a backup. In addition, the backup catalog may also include a list of objects required to perform a full restore to each of the backup times.

Accordingly, the metadata database 160 may be leveraged by the server 120 when managing backup data and providing email previews as further described herein.

Figure 2:
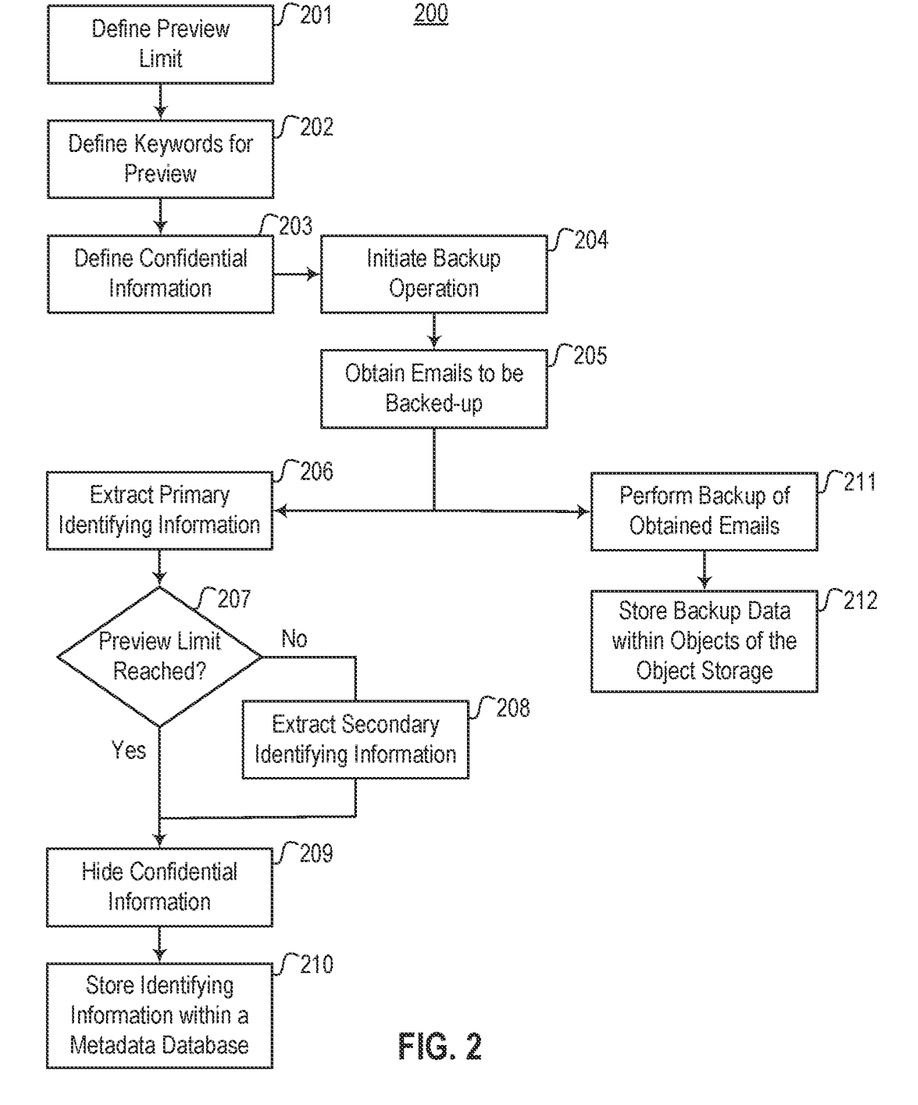
FIG. 2 is a process flow diagram illustrating an example process for creating preview information for backed-up emails according to one or more embodiments of the disclosure.

FIG. 2 is a flow diagram illustrating an example process for creating preview information for backed-up emails according to one or more embodiments of the disclosure. Process 200 may use processing logic, which may include software, hardware, or a combination thereof. For example, process 200 may be performed by a system including one or more components described in operating environment 100 (e.g. server 120, etc.).

As shown, in 201, the system (e.g. server 120) may define a preview limit. In some embodiments, the preview limit may specify the maximum number of words or characters that may be stored when providing an email preview. In some embodiments, the preview limit may be user-configurable. For example, a user (e.g. backup administrator) may specify the preview limit as part of one or more settings when configuring the email preview feature. In 202, the system may define one or more keywords that are used to determine which sentences (or portions, paragraphs, etc.) of the email body (or message body) to include as part of the email preview. In some embodiments, these keywords may be user-configurable. For example, a user (e.g. backup administrator) may specify such keywords as part of one or more settings when configuring the email preview feature. In some embodiments, the preview limit and keywords may be defined by a user prior to initiating a backup, for example, as part of an initial configuration operation. In 203, the system may define emails or text within an email that should remain confidential (or private), and thus, should not be included as part of the preview. This may include specifying emails associated with particular accounts (e.g. email accounts), users, domains, etc. that are to be excluded from having an email preview feature. For example, email accounts associated with certain roles (e.g. executive team, legal team, etc.) may be specified. In addition, the system may define individual types of emails that are to be excluded from the email preview feature. For example, emails including particular terms as part of the subject line (e.g. "confidential", "private", etc.) may be specified. In some embodiments, the system may define certain terms (e.g. text) to be hidden (or masked) when displaying a preview. For example, personal information (e.g. address, phone number, SIN, etc.), passwords (and usernames), financial information (e.g. credit card number, bank account information, etc.), or other types of sensitive information within an email may be hidden when providing a preview.

In 204, the system may initiate a backup operation. For example, the backup operation may be initiated by a user, based on a schedule, or in response to detecting a particular event. After a backup operation has been initiated, in 205, the system may obtain (or retrieve, get, download, etc.) the emails (e.g. emails 117) that are to be backed up. The emails may be obtained from a client device (e.g. client device 110), an email server (e.g. cloud-based email server), or another data source. In some embodiments, the system may obtain the emails using an API. For example, a cloud-based email server may provide an API (e.g. representational state transfer API) that may be accessed to obtain emails associated with a particular client, account, user, etc. For example, the system may obtain data including the emails and associated information in a particular standardized format (e.g. HTML, XML, JSON, etc.). Once the emails (or email data) are obtained, the system may process the emails as part of a backup operation. This processing may include obtaining (or extracting) the necessary information from the emails used to create the email preview. In particular, the system may extract identifying information from the emails to be backed up. When extracting identifying information, the system copies the information and the original email data remains intact such that the backed-up email may be fully restored (or recovered) exclusively from the backup data (e.g. backed-up emails 157). The identifying information (or preview information) may include information (e.g. text) that may be provided to a user to aid the user in identifying (or recognizing) a particular email for restoration.

In some embodiments, the extraction process may include performing multiple phases of extraction depending on the settings specified for the email preview feature. In some embodiments, the phases may be based on the defined preview limit, the keywords, and various other characteristics. For example, depending on the preview limit, the system may perform multiple phases of extraction if the preview limit allows for additional information to be included beyond the primary identifying information. More particularly, in 206, the system may extract (e.g. copy) primary identifying information from the email data obtained in 205. For example, the system may extract information from a structured file (e.g. HTML, XML, JSON, etc.) that stores the emails. For example, the system may extract identifying information using tags (or labels, identifiers, etc.) implemented by the structured file. In some embodiments, the primary identifying information may include one or more of a sender, receiver, subject line, date/time, names/filenames (or identifiers) of any attachments, and particular sentences from the email body. In addition, the primary identifying information may also include metadata associated with the email such as time sent/received, read status, priority status, importance level, attachment sizes, due dates, etc. The identifying information may also include metadata associated with any attachments such as attachment type, file extensions, size (e.g. file size), author, times (e.g. creation time, last modified time, etc.), etc. When extracting particular sentences from the email body, the system may identify sentences (or portions thereof) that contain a particular keyword (e.g. keywords defined in operation 202). To extract such sentences, the system may parse (or read, scan, analyze, etc.) each sentence of the message body to determine whether the sentence contains a keyword. Sentences that contain at least one keyword may be marked (or tagged) and stored as part of the identifying information. In some embodiments, the keywords may include terms used as part of the subject line. In some embodiments, the keywords may include terms that are associated with a degree of importance. For example, these terms may include names (e.g. names associated with the sender or recipient), action terms (e.g. "let's", "meet", "ASAP", "action", etc.), opinion terms (e.g. "IMO", "Opinion", "Suggest", etc.), and any other terms including user-definable terms.

When extracting the identifying information, the system may track the number of words or characters that are extracted, and in 207, determine whether the preview limit (e.g. preview limit defined in 201) has been reached. For example, the system may first extract one or more of the sender, receiver, subject line, date/time, and filenames of any attachments, and then extract sentences containing keywords until the preview limit is reached. If the preview limit has been reached, the system may proceed to 209

If the preview limit has not been reached, the system may continue to extract identifying information. In particular, in 208, the system may extract secondary identifying information. In some embodiments, the secondary identifying information including additional sentences from particular portions of the email body. For example, the system may extract additional sentences from one or more of a beginning (or first) portion of the email body (e.g. first 255 characters of the email body), a middle portion of the email body (e.g. substantially middle 255 characters of the email body), or an end (or last) portion of the email body (e.g. last 255 characters of the email body). For example, if the number of characters of the extracted primary identifying information is 250 characters and the preview limit is set at 500 characters, the system may extract the first 250 characters of the email body as the secondary identifying information to also be included as part of the preview. The system may also not include a particular sentence more than once as part of the preview (e.g. the system may remove duplicate extracted sentences).

In some embodiments, as part of, or as an alternative to, extracting the primary and secondary identifying information, the system may extract information based on a priority ordering until the preview limit is reached. For example, the system may prioritize (or order, tier, etc.) certain keywords. For instance, the system may first extract sentences containing the highest priority keywords and continue based on the priority ordering until the preview limit is reached (or all sentences containing the keywords are extracted).

In 209, the system may hide confidential information from the extracted identifying information (e.g. confidential information defined in operation 203). In other words, despite securing the extracted identifying information, the system may include an additional layer of security by not storing, or showing, confidential information as part of an email preview. In particular, when extracting particular sentences from the email body, the system may identify text (e.g. characters, words, etc.) that describe potentially confidential (or sensitive) information. For example, the system may parse (or read, scan, analyze, etc.) extracted sentences of the message body to determine if the particular sentences contain confidential information. When parsing the extracted sentences, the system may identify patterns of text (e.g. a string of digits matching a credit card number, SIN, PIN, etc.), particular sentences or words (e.g. "Here is my account info . . . "), or any other patterns that may identify portions of the identifying information that may include confidential information. When confidential information is detected, the system may replace the text of the confidential information with replacement text (e.g. asterisks "*"), or remove (or leave blank) the confidential information. Accordingly, the confidential information may not be included as part of the extracted identifying information (e.g. preview information) stored by the system (e.g. in 210). It should be noted that the confidential information, however, may be stored by the system (e.g. in 212) as part of the backup data in order to provide the ability to fully restore the backed-up emails.

In 210, the system may store the extracted identifying information within a metadata database (e.g. metadata database 160). For example, the extracted identifying information may be stored as part of metadata associated with the backed-up emails. The metadata database may be a separate data store than the objects (e.g. objects 155) storing the actual backup data of the emails.

In 211, the system may also perform a backup of the obtained emails. This may include processing (e.g. deduplicating, compressing, encrypting, etc.) the obtained emails for storage onto the object storage. Accordingly, in 212, the system may store the backup data (e.g. backed-up emails) within objects of the object storage. In some embodiments, the system may perform an incremental backup, and accordingly, only the new backup data (e.g. new and/or modified emails) may be stored within new objects and the emails backed up as part of previous backups may be retained within existing objects. In some embodiments, the system may also store various types of metadata associated with the backed-up emails. For example, the system may store a storage location (e.g. object identifier) indicating which object the backup data for a particular email is stored. In some embodiments, this metadata may be stored as part of the metadata database storing the extracted identifying information. It should be noted that the extraction process (e.g. operations 206-210) may be performed in parallel with the backup process (e.g. operations 211-212).

As described, the system may maintain a separate metadata database that may be directly accessed to obtain preview information. This provides an efficient mechanism to provide the preview information. For example, a user may preview individual emails for restore without the system having to access the objects on the object storage that store the actual backup data. For instance, the backup data may be compressed, encrypted, deduplicated, etc., and the system may not be required to convert (or "rehydrate") the data into a useable format until an actual restore is initiated.

Figure 3:
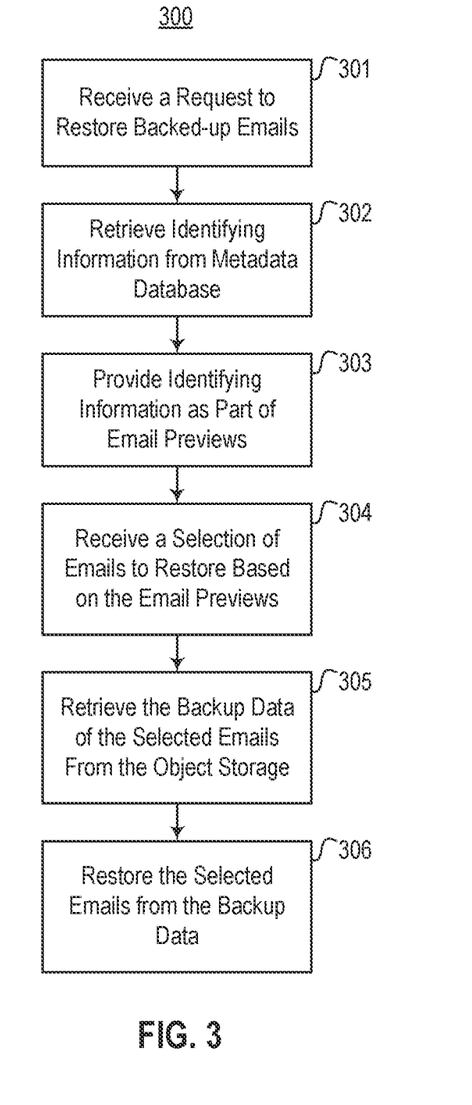
FIG. 3 is a process flow diagram illustrating an example process for restoring backed-up emails based on preview information according to one or more embodiments of the disclosure.

FIG. 3 is a flow diagram illustrating an example process for restoring backed-up emails based on preview information according to one or more embodiments of the disclosure. Process 300 may use processing logic, which may include software, hardware, or a combination thereof. For example, process 300 may be performed by a system including one or more components described in operating environment 100 (e.g. server 120, etc.).

In 301, the system (e.g. server 120) may receive a request to restore backed-up emails. For example, a user that wishes to restore (or recover) particular emails may initiate a process to preview backed-up emails. In 302, the system may retrieve identifying information corresponding to the backed-up emails from the metadata database. For example, the system may access the metadata database, which may be stored locally or as part of the object storage, without having to access objects storing the actual backed-up emails. In 303, the system may provide the retrieved identifying information as part of an email preview for the corresponding backed-up emails. For example, the system may provide the identifying information as part of a graphical user interface (GUI) that displays previews of the corresponding backed-up emails. In some embodiments, the system may provide the GUI as part of a web-based interface. The email preview (or email preview) may display details of a particular (e.g. corresponding) email to a user. In some embodiments, the email preview may emulate the layout of an email displayed within an email application (e.g. Microsoft Outlook). For example, the email preview may be provided as part of a layout that indicates the sender, receiver (e.g. to, cc, and bcc fields), subject line, details regarding attachments (e.g. file attachments, item attachments, reference attachments, etc.) such as a file/item name, size, and other details that may be associated with an attachment. It should be noted that an attachment is to be broadly construed to include various items that may be "attached" or "linked" to an email. These attachments may be application-specific items of applications associated with (e.g. provided by) the same provider (or entity) of the emails/email provider. For example, the items may include action items, calendar appointments, meetings, tasks, reminders, contact information, etc. that may be associated with other applications. In some embodiments, the user may navigate the email previews in a similar manner as navigating emails within an email application. For example, the system may sort (or order) the previews based on identifying information (e.g. time/date, sender, subject, etc.). In addition, the system may provide the ability to search the identifying information to identify particular emails.

After providing an email preview, the system may receive a request to restore particular emails. For example, in 304, the system may receive a selection of one or more emails to restore based on the email previews. For example, a user may select one or more of the email previews to identify which emails to restore. In 305, the system may retrieve backup data (e.g. backed-up emails) of the selected emails from the object storage. For example, the system may retrieve the backed-up emails from the object storage corresponding to the selected email previews. In some embodiments, when retrieving the backup data, the system may retrieve (or determine) a storage location for the backup data from the metadata database (or other data store). In 306, the system may restore the selected (e.g. individual) emails from the retrieved backup data. For example, the system may only access the appropriate objects when performing a restore operation. In other words, the system may restore individual emails by accessing the minimum about of objects necessary. Put another way, the system may perform an efficient restore by accessing only the objects that are required for restoring particular emails. Such a feature is useful particularly when incremental backups are implemented. For example, related emails (e.g. emails within an email chain) may be stored within different objects because such emails may be backed up at different times. Accordingly, the system need not access the different objects, and instead, access the particular object storing the backup data for the email being restored.

Figure 4:
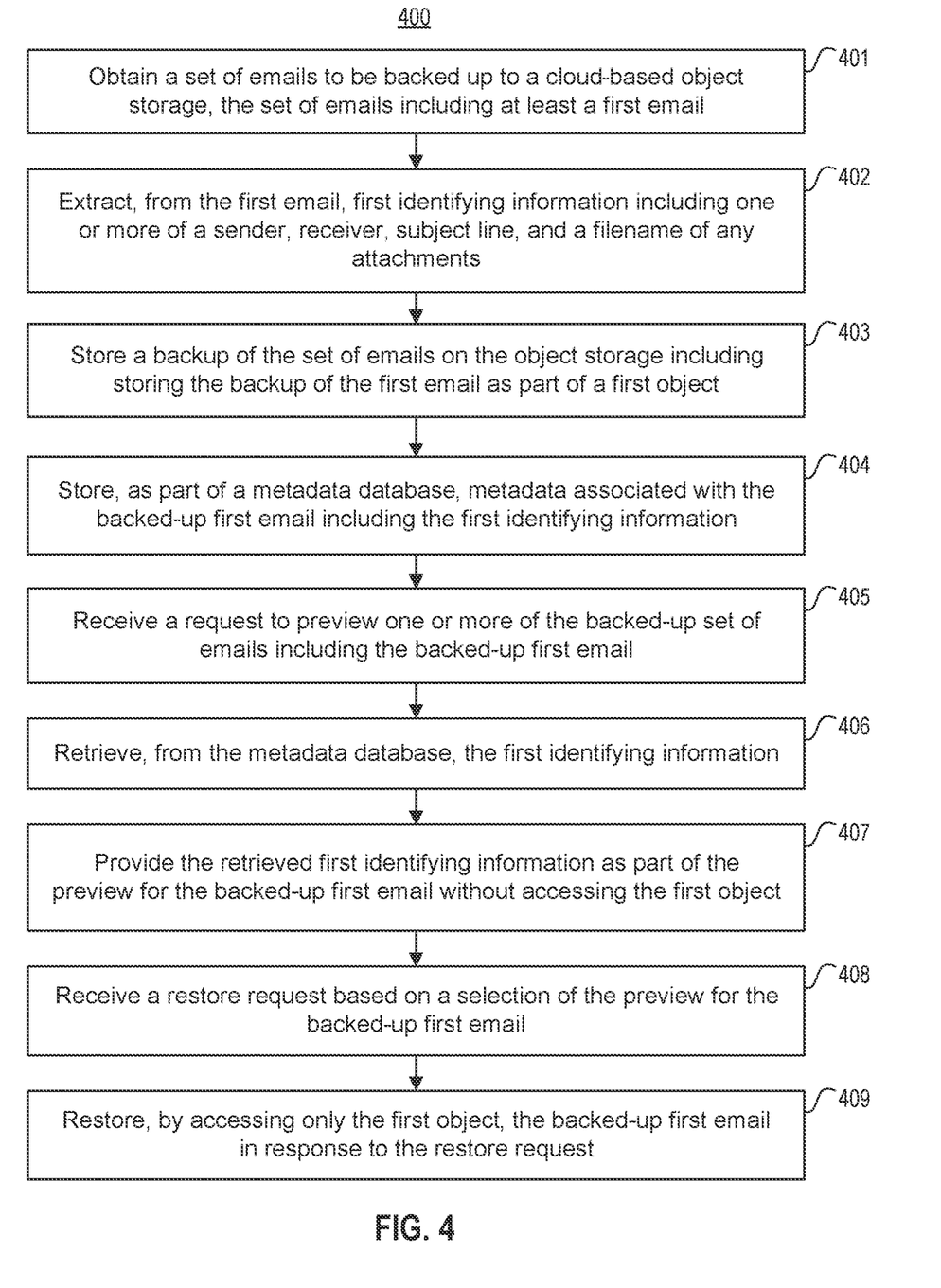
FIG. 4 is a flow diagram illustrating an example method of providing a preview for a backed-up email according to one or more embodiments of the disclosure.

FIG. 4 is a flow diagram illustrating an example method of providing a preview for a backed-up email according to one or more embodiments of the disclosure. Process 400 may use processing logic, which may include software, hardware, or a combination thereof. For example, process 400 may be performed by a system including one or more components described in operating environment 100 (e.g. server 120, manger 175, etc.).

In 401, the system (e.g. server 120) may obtain a set of emails to be backed up to a cloud-based object storage (e.g. object storage 150). The set of emails may include at least a first email. In some embodiments, the system may obtain the set of emails by retrieving email data from a client device or email server.

In 402, the system may extract identifying information from the set of emails. This may include extracting, from the first email, first identifying information. In some embodiments, the identifying information may include one or more of a sender, receiver, subject line, and a filename of any attachments. In some embodiments, the system may extract such information as part of the primary identifying information.

When performing an extraction, the extraction may include parsing sentences of a message body of the first email, determining a first set of sentences of the message body contain one or more predetermined keywords, and adding the first set of sentences to the first identifying information. In addition, the system may add additional sentences to the identifying information based on a preview limit. For example, in some embodiments, the extraction may further include determining a number of words or characters of the first identifying information does not exceed a predetermined preview limit, and in response, adding a second set of sentences from the message body of the first email based on an available number of words or characters according to the predetermined preview limit. In some embodiments, the second set of sentences may be selected from a beginning portion (e.g. first 255 characters) or an end portion (e.g. last 255 characters) of the message body of the first email. In some embodiments, at least some of the first or second set of sentences may be extracted as part of the secondary identification information. For example, the system may extract the secondary identification information after determining the primary identifying information does not exceed the preview limit.

In 403, the system may store a backup of the set of emails (e.g. backed-up emails 157) on the object storage. This may include storing the backup (or backup data) of the first email as part of a first object.

In 404, the system may store metadata associated with the backed-up emails. In some embodiments, the metadata may be stored as part of a metadata database (e.g. metadata database 160). The metadata may include the first identifying information. Accordingly, the metadata associated with the backed-up first email including the first identifying information may be stored as part of the metadata database (e.g. as preview information 163). In some embodiments, the system may also store an identifier for the first object as a storage location for the backed-up first email. The identifier may also be stored as part of the metadata database.

In some embodiments, the system may also hide confidential information of the first identifying information by replacing the confidential information with replacement text.

Accordingly, the confidential information may not be stored as part of the metadata database.

In 405, the system may receive a request to preview one or more of the backed-up set of emails, which may include the backed-up first email. For example, the system may receive an instruction (e.g. by a user) to display previews of emails to be selected for restore.

In 406, the system may retrieve the first identifying information from the metadata database. In some embodiments, the system may locally store (or cache) portions of the metadata database such that the first identifying information may be retrieved in an efficient manner (e.g. quickly).

In 407, the system may provide the retrieved first identifying information as part of the preview for the backed-up first email. For example, the system may provide the retrieved first identifying information for display on a graphical user interface (GUI). For instance, a user performing a restore may navigate the GUI to view previews (or email previews). In some embodiments, the system may provide the retrieved first identifying information without accessing the first object.

In 408, the system may receive a restore request based on a selection of the preview for the backed-up first email. For example, the preview for the backed-up first email may be provided as part of a GUI, and accordingly, the selection of the preview for the backed-up first email may be received from a user via the GUI. For example, a user may select a visual element (e.g. checkbox) associated with the preview of the backed-up first email to indicate that the user wishes to restore the backed-up first email.

In some embodiments, in response to receiving the restore request, the system may also retrieve (e.g. from the metadata database) the identifier for the first object as the storage location for the backed-up first email.

In 409, the system may restore, by accessing only the first object, the backed-up first email in response to the restore request. For example, the system may determine the data for the backed-up first email is stored within the first object based on the storage location information retrieved from the metadata database. Accordingly, the system may restore the backed-up first email without accessing unnecessary objects that do not store the data required to perform such a restore.

Accordingly, in some embodiments, the method provides the ability for the system to efficiently provide a preview when initiating a restore of individual emails.

Figure 5:
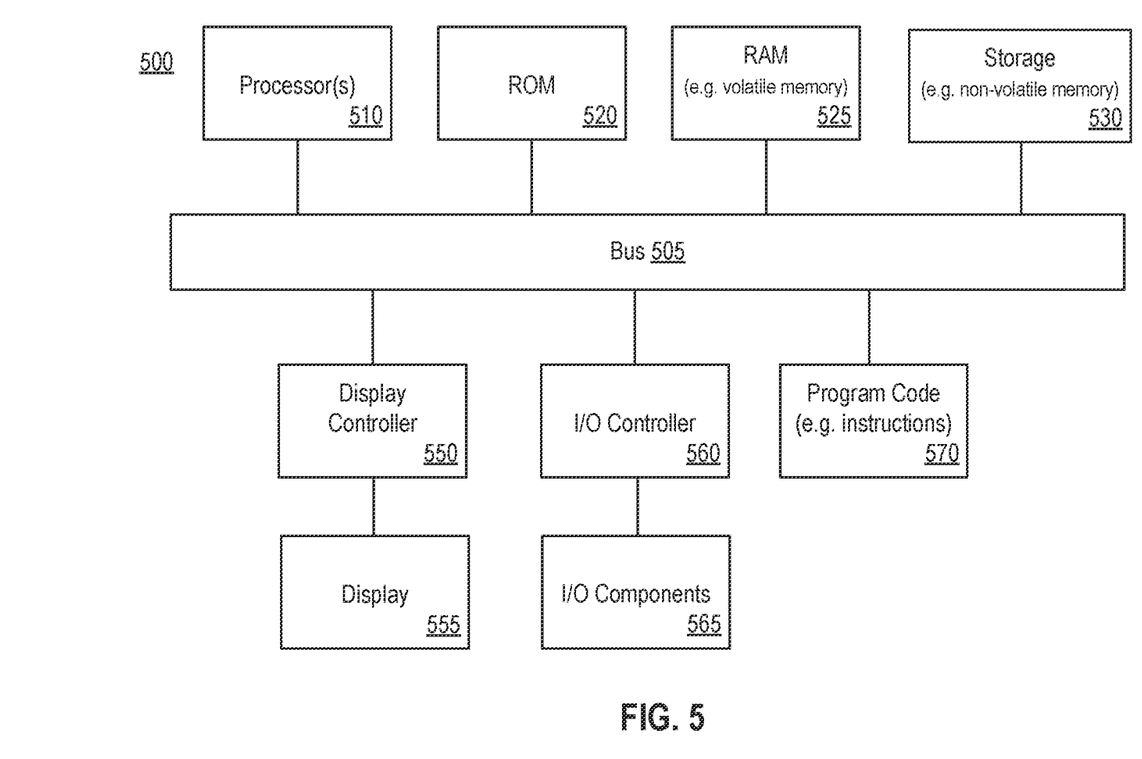
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, manager 175/177, engine 135, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   obtain, by a server, a set of emails to be backed up to a cloud-based object storage, the set of emails including at least a first email;
   extract, from the first email, first identifying information including one or more of a sender, receiver, subject line, and a filename of any attachments;
   store a backup of the set of emails on the object storage including storing the backup of the first email as part of a first object;
   store, as part of a metadata database, metadata associated with the backed-up first email including the first identifying information;
   receive a request to preview one or more of the backed-up set of emails including the backed-up first email;
   retrieve, from the metadata database, the first identifying information; and
   provide the retrieved first identifying information as part of the preview for the backed-up first email without accessing the first object.

2. The system of claim 1, wherein the plurality of instructions, when executed, further cause the one or more processors to:
   receive a restore request based on a selection of the preview for the backed-up first email; and
   restore, by accessing only the first object, the backed-up first email in response to the restore request.

3. The system of claim 2, wherein the plurality of instructions, when executed, further cause the one or more processors to:
   store, as part of the metadata database, an identifier for the first object as a storage location for the backed-up first email; and
   retrieve, from the metadata database, the identifier for the first object as the storage location for the backed-up first email, in response to receiving the restore request.

4. The system of claim 2, wherein the preview for the backed-up first email is provided as part of a graphical user interface (GUI), and the selection of the preview for the backed-up first email is received via the GUI.

5. The system of claim 1, wherein the extracting further includes:
   parsing sentences of a message body of the first email;
   determining a first set of sentences of the message body contain one or more predetermined keywords; and
   adding the first set of sentences to the first identifying information.

6. The system of claim 5, wherein the extracting further includes:
   determining a number of words or characters of the first identifying information does not exceed a predetermined preview limit; and
   adding a second set of sentences from the message body of the first email based on an available number of words or characters according to the predetermined preview limit.

7. The system of claim 6, wherein the second set of sentences are selected from a beginning portion or an end portion of the message body of the first email.

8. The system of claim 1, wherein the plurality of instructions, when executed, further cause the one or more processors to:
   hide confidential information of the first identifying information by replacing the confidential information with replacement text.

9. A method comprising:
   obtaining, by a server, a set of emails to be backed up to a cloud-based object storage, the set of emails including at least a first email;
   extracting, from the first email, first identifying information including one or more of a sender, receiver, subject line, and a filename of any attachments;
   storing a backup of the set of emails on the object storage including storing the backup of the first email as part of a first object;
   storing, as part of a metadata database, metadata associated with the backed-up first email including the first identifying information;
   receiving a request to preview one or more of the backed-up set of emails including the backed-up first email;
   retrieving, from the metadata database, the first identifying information; and
   providing the retrieved first identifying information as part of the preview for the backed-up first email without accessing the first object.

10. The method of claim 9, further comprising:
    receiving a restore request based on a selection of the preview for the backed-up first email; and
    restoring, by accessing only the first object, the backed-up first email in response to the restore request.

11. The method of claim 10, further comprising:
    store, as part of the metadata database, an identifier for the first object as a storage location for the backed-up first email; and
    retrieve, from the metadata database, the identifier for the first object as the storage location for the backed-up first email, in response to receiving the restore request.

12. The method of claim 10, wherein the preview for the backed-up first email is provided as part of a graphical user interface (GUI), and the selection of the preview for the backed-up first email is received via the GUI.

13. The method of claim 9, wherein the extracting further includes:
parsing sentences of a message body of the first email;
determining a first set of sentences of the message body contain one or more predetermined keywords; and
adding the first set of sentences to the first identifying information.

14. The method of claim 13, wherein the extracting further includes:
determining a number of words or characters of the first identifying information does not exceed a predetermined preview limit; and
adding a second set of sentences from the message body of the first email based on an available number of words or characters according to the predetermined preview limit.

15. A computer program product comprising a non-transitory computer-readable medium having a computer-readable program code embodied therein to be executed by one or more processors, the program code including instructions to:
obtain, by a server, a set of emails to be backed up to a cloud-based object storage, the set of emails including at least a first email;
extract, from the first email, first identifying information including one or more of a sender, receiver, subject line, and a filename of any attachments;
store a backup of the set of emails on the object storage including storing the backup of the first email as part of a first object;
store, as part of a metadata database, metadata associated with the backed-up first email including the first identifying information;
receive a request to preview one or more of the backed-up set of emails including the backed-up first email;
retrieve, from the metadata database, the first identifying information; and
provide the retrieved first identifying information as part of the preview for the backed-up first email without accessing the first object.

16. The computer program product of claim 15, wherein the program code includes further instructions to:
receive a restore request based on a selection of the preview for the backed-up first email; and
restore, by accessing only the first object, the backed-up first email in response to the restore request.

17. The computer program product of claim 16, wherein the program code includes further instructions to:
store, as part of the metadata database, an identifier for the first object as a storage location for the backed-up first email; and
retrieve, from the metadata database, the identifier for the first object as the storage location for the backed-up first email, in response to receiving the restore request.

18. The computer program product of claim 16, wherein the preview for the backed-up first email is provided as part of a graphical user interface (GUI), and the selection of the preview for the backed-up first email is received via the GUI.

19. The computer program product of claim 15, wherein the extracting further includes:
parsing sentences of a message body of the first email;
determining a first set of sentences of the message body contain one or more predetermined keywords; and
adding the first set of sentences to the first identifying information.

20. The computer program product of claim 19, wherein the extracting further includes:
determining a number of words or characters of the first identifying information does not exceed a predetermined preview limit; and
adding a second set of sentences from the message body of the first email based on an available number of words or characters according to the predetermined preview limit.

* * * * *